(12) United States Patent
Zhang

(10) Patent No.: US 11,616,554 B2
(45) Date of Patent: *Mar. 28, 2023

(54) METHOD AND DEVICE IN UE AND BASE STATION FOR MULTI-ANTENNA TRANSMISSION

(71) Applicant: Xiaobo Zhang, Shanghai (CN)

(72) Inventor: Xiaobo Zhang, Shanghai (CN)

(73) Assignee: Dido Wireless Innovations LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,718

(22) Filed: Nov. 2, 2021

(65) Prior Publication Data

US 2022/0060237 A1 Feb. 24, 2022

Related U.S. Application Data

(63) Continuation of application No. 16/554,566, filed on Aug. 28, 2019, now Pat. No. 11,201,656, which is a
(Continued)

(51) Int. Cl.
*H04B 7/06* (2006.01)
*H04L 5/00* (2006.01)
(Continued)

(52) U.S. Cl.
CPC ......... *H04B 7/0634* (2013.01); *H04L 5/0082* (2013.01); *H04W 24/08* (2013.01); *H04W 72/0446* (2013.01)

(58) Field of Classification Search
CPC .... H04B 7/0634; H04B 7/0695; H04B 7/088; H04B 7/2662; H04B 7/0802;
(Continued)

(56) References Cited

U.S. PATENT DOCUMENTS

2013/0077523 A1* 3/2013 Ko .............. H04L 1/0029
370/252
2015/0124679 A1* 5/2015 Yi .............. H04W 74/0833
370/311

FOREIGN PATENT DOCUMENTS

CN 101459457 A 6/2009
CN 102668406 A 9/2012
(Continued)

OTHER PUBLICATIONS

1st Search Report in CN application No. 201780069301.1 dated Jan. 17, 2021.
(Continued)

*Primary Examiner* — Thai Nguyen

(57) ABSTRACT

The disclosure provides a method and a device in a User Equipment (UE) and a base station for multi-antenna transmission. The UE transmits a first radio signal in a first time interval, and receives a second radio signal in a second time interval; and then monitors a third radio signal in a third time interval. The first radio signal comprises first information, and the second radio signal comprises second information. Target information is used for a multi-antenna related receiving in the third time interval. A time-domain position of the second time interval is used for determining whether the target information is the first information or the second information. A time-domain position of the third time interval is associated to a time-domain position of the first time interval. The UE can select a beam direction corresponding to a downlink channel according to its measurement, thereby improving efficiency and performances of downlink transmission.

20 Claims, 11 Drawing Sheets

Related U.S. Application Data continuation of application No. PCT/CN2017/076965, filed on Mar. 16, 2017.

(51) Int. Cl.
  *H04W 24/08* (2009.01)
  *H04W 72/0446* (2023.01)

(58) Field of Classification Search
  CPC ... H04L 5/0082; H04L 5/0048; H04L 5/0053; H04L 5/0094; H04W 24/08; H04W 72/0446
  See application file for complete search history.

(56) References Cited

FOREIGN PATENT DOCUMENTS

| CN | 105429683 A | 9/2014 | | |
| CN | 104272605 A | 1/2015 | | |
| CN | 106374984 A | 7/2015 | | |
| CN | 104956606 A | 9/2015 | | |
| CN | 105122676 A | 12/2015 | | |
| CN | 106105311 A | 11/2016 | | |
| WO | 2014139174 A1 | 9/2014 | | |
| WO | WO-2014139174 A1 * | 9/2014 | ........... | H04B 7/0695 |
| WO | 2016006964 A1 | 7/2015 | | |
| WO | 2017030601 A1 | 2/2017 | | |

OTHER PUBLICATIONS

Supplementary Search Report in CN application No. 201780069301.1 dated Mar. 31, 2021.
1st Office Action in CN application No. 201780069301.1 dated Jan. 26, 2021.
2nd Office Action in CN application No. 201780069301.1 dated Apr. 19, 2021.
Issue notification in CN application No. 201780069301.1 dated Jun. 2, 2021.
ISR received in application No. PCT/CN2017/076965 dated Dec. 8, 2017.

* cited by examiner

METHOD AND DEVICE IN UE AND BASE STATION FOR MULTI-ANTENNA TRANSMISSION

CROSS-REFERENCE TO RELATED APPLICATION

This application is a continuation of U.S. application Ser. No. 16/554,566, filed on Aug. 28, 2019, which is a continuation of International Application No. PCT/CN2017/076965, filed Mar. 16, 2017, the full disclosure of which is incorporated herein by reference.

BACKGROUND

Technical Field

The disclosure relates to transmission methods and devices in wireless communication systems, and in particular to a method and device for multi-antenna transmission in wireless communication.

Related Art

In existing Long Term Evolution (LTE) systems, a User Equipment (UE) will search for Downlink Control Information (DCI) in a downlink subframe so as to acquire a grant coming from a base station. In consideration of requirements of robustness and high coverage of DCI transmission, a control channel corresponding to a DCI is generally transmitted through a diversity or precoder cycling mode. However, a transmission mode of multi-antenna employed by a data channel and relevant information are generally determined through both a DCI and a higher-layer signaling.

In future mobile communication systems, since beamforming and massive Multiple Input Multiple Output (MIMO) systems are introduced, transmission modes of downlink control channels and data channels need to be designed again.

SUMMARY

In future mobile communication systems, a base station will transmit a downlink control channel and a downlink data channel on multiple Tx-beams. Meanwhile, a User Equipment (UE) will detect a downlink control channel and a downlink data channel on multiple Rx-beams. Because of UE's mobility, rotation, and blocking of transmission path, the UE may switch between multiple Tx-beams or multiple Rx-beams to acquire a better quality of reception, particularly a quality of reception of a control signaling. In view of the above problems, one solution is that the UE monitors a quality of a beam used for receiving a control signaling while monitoring the control signaling, and, when the quality of the beam degrades, reports it to the base station so that the base station configures a new beam for the UE. However, this solution has a significant problem that the switching speed of the beam is slower and performances cannot be guaranteed.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for multi-antenna transmission, wherein the method includes:

transmitting a first radio signal in a first time interval, and receiving a second radio signal in a second time interval; and monitoring a third radio signal in a third time interval.

Herein, the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the above method is characterized in that: the first information is used by the UE to indicate at least one of a Tx-beam of a base station or an Rx-beam of a terminal corresponding to the third radio signal preferred by the UE. When the third time interval and the first time interval meet a given requirement, the UE receives the third radio signal according to a Tx-beam of a base station or an Rx-beam of a terminal corresponding to the first information.

In one embodiment, the multi-antenna related receiving refers to generation of a beamforming matrix for receiving.

In one embodiment, the multi-antenna related receiving refers to a receiving corresponding to one multi-antenna transmission scheme in SFBC, STBC, Precoder Cycling or Transmit beamforming.

In one embodiment, the multi-antenna related receiving refers to an antenna virtualization for receiving.

In one embodiment, the above method has a following benefit: a relationship is established between the third time interval and the first time interval, and the UE does not need to redetermine a receiving mode of the third radio signal through a confirmation of the base station, so that the receiving mode of the third radio signal is adjusted more quickly according to the monitoring or sensing of the UE and performances of transmission are improved.

In one embodiment, the above method is further characterized in that: when the second radio signal indicates at least one of a Tx-beam of a base station or an Rx-beam of a terminal corresponding to the third radio signal, and the second time interval meets a given requirement, the second information will substitute the first information to indicate beam information of the third radio signal. The beam information is at least one of a Tx-beam of a base station or an Rx-beam of a terminal corresponding to the third radio signal.

In one embodiment, the above method has a following benefit: the base station configures a receiving mode of the third radio signal through the second information, so as to ensure that, when the base station configures the UE, the receiving by the UE is still performed based on the configuration of the base station. The above method ensures that the terminal still works based on the scheduling of the base station.

In one embodiment, the above method has another following benefit: a relationship is established in time domain between the first time interval and the third time interval, the above beam information based on a judgment of the UE takes effect in the third time interval only, and a probability of risk caused by the UE selecting an error beam is reduced.

In one embodiment, the first information is dynamic.
In one embodiment, the second information is semi-static.
In one embodiment, the second information is dynamic.

In one embodiment, the first information is carried by a physical layer signaling, and the second information is carried by a higher-layer signaling.

In one embodiment, the first information and the second information are carried by physical layer signalings respectively.

In one embodiment, the first radio signal is Uplink Control Information (UCI).

In one embodiment, a transport channel corresponding to the second radio signal is a Downlink Shared Channel (Dl-SCH).

In one embodiment, the second radio signal is a DCI.

In one embodiment, the first information is used for determining a first antenna port group, and the first antenna port group includes a positive integer number of antenna port(s).

In one embodiment, the antenna port in the first antenna port group is used for transmitting a Channel Status Information Reference Signal (CSI-RS).

In one subembodiment, the target information is the first information, and the UE assumes that the first antenna port group is used for transmitting the third radio signal.

In one embodiment, the antenna port in the first antenna port group is used for transmitting a downlink radio signal.

In one embodiment, the first antenna port group corresponds to one Tx-beam of a base station providing services for the UE, or the first antenna port group corresponds to one Tx-beam of a Transmission Reception Point (TRP) providing services for the UE.

In one embodiment, the second information indicates an index of a second vector group, and the second vector group includes a positive integer number of vector(s) used for an Rx-beam.

In one subembodiment, the target information is the second information, and the UE performs receiving antenna virtualization using the second vector group in the third time interval.

In one embodiment, the first information indicates an index of a first vector group, and the first vector group includes a positive integer number of vector(s) used for an Rx-beam.

In one subembodiment, the target information is the first information, and the UE performs receiving antenna virtualization using the first vector group in the third time interval.

In one embodiment, the antenna port group in the disclosure includes a positive integer number of Antenna Ports (APs).

In one subembodiment, the antenna port group includes one AP only.

In one subembodiment, the AP is formed by multiple physical antennas through antenna virtualization superposition. Mapping coefficients from the AP to the multiple physical antennas constitute beamforming vectors, which are applied to the antenna virtualization to form a beam.

In one embodiment, the phrase that a time-domain position of the third time interval is associated to a time-domain position of the first time interval refers that: a start time of the first time interval is T0 ms, a start time of the third time interval is T3 ms, and a difference between the T3 and the T0 is Ta. The Ta is fixed, or the Ta is configurable.

In one subembodiment, the Ta is a positive integer.

In one embodiment, the phrase that a time-domain position of the third time interval is associated to a time-domain position of the first time interval refers that: an end time of the first time interval is T1 ms, a start time of the third time interval is T3 ms, and a difference between the T3 and the T1 is Tb. The Tb is fixed, or the Tb is configurable.

In one subembodiment, the Tb is a positive integer.

Specifically, according to one aspect of the disclosure, the above method is characterized in that: the first information is used for determining at least one of a first antenna port group or an index of a first vector group, the first antenna port group includes a positive integer number of antenna port(s), and the first vector group includes a positive integer number of vector(s) used for an Rx-beam.

In one embodiment, the above method is characterized in that: the first antenna port group is used for determining a Tx-beam of a base station corresponding to the third radio signal, and the first vector group is used for determining an Rx-beam of a terminal corresponding to the third radio signal.

In one embodiment, the target information is the first information, and the UE assumes that the first antenna port group is used for transmitting the third radio signal.

In one embodiment, the target information is the first information, and the UE assumes that an antenna port group used for transmitting the third radio signal is Quasi Co-located (QCLed) with the first antenna port group.

In one embodiment, the target information is the first information, and the UE performs receiving antenna virtualization using the first vector group in the third time interval.

In one embodiment, the antenna port in the first antenna port group is used for transmitting a downlink radio signal.

Specifically, according to one aspect of the disclosure, the above method is characterized in that: the second information indicates an index of a second vector group, and the second vector group includes a positive integer number of vector(s) used for an Rx-beam.

In one embodiment, the above method is characterized in that the second information is used for determining an Rx-beam of a terminal corresponding to the third radio signal.

In one embodiment, the target information is the second information, and the UE performs receiving antenna virtualization using the second vector group in the third time interval.

In one embodiment, the second vector group corresponds to one Rx-beam of the UE.

Specifically, according to one aspect of the disclosure, the above method is characterized in that: the first time interval and the second time interval are before the third time interval respectively. If the second time interval belongs to a first time window, the target information is the second information; otherwise, the target information is the first information. The first time window is before the third time interval.

In one embodiment, the above method is characterized in that: the target information is determined according to whether the second time interval belongs to a first time window, so as to ensure that, when there is an indication (the second information) from the base station, the indication of the base station has a higher priority than the reporting by the UE, and the UE determines the beam information of a downlink radio signal according to the indication from the base station.

In one embodiment, the above method is further characterized in that: when the first time window is configurable, and a duration configured for the first time window is relatively short, the UE receives the third radio signal according to its own reporting (the first information), thereby adapting to changes of beams more quickly, without waiting for a confirmation from the base station.

In one embodiment, a time-domain position of the first time window and a time-domain position of the first time interval are associated.

In one embodiment, the first time interval occupies one subframe in time domain, or the first time interval occupies one slot in time domain.

In one embodiment, the second time interval occupies one subframe in time domain, or the second time interval occupies one slot in time domain.

In one embodiment, the third time interval occupies one subframe in time domain, or the third time interval occupies one slot in time domain.

In one embodiment, the first time window occupies P consecutive subframe(s) in time domain, or the first time window occupies P consecutive slot(s) in time domain. The P is a positive integer.

In one subembodiment, the P is fixed, or the P is configurable.

In one embodiment, the first time window occupies T ms in time domain. The T is a positive integer.

In one subembodiment, the T is fixed, or the T is configurable.

In one subembodiment, the T is related to a processing capability of the UE.

In one embodiment, an end time of the first time window is a start time of the third time interval.

In one embodiment, a start time of the first time window is behind a start time of the first time interval, and the start time of the first time window is before a start time of the third time interval.

In one embodiment, a start time of the first time window is behind a start time of the first time interval, and an end time of the first time window is before a start time of the third time interval.

In one embodiment, a start time of the first time window is before a start time of the first time interval.

Specifically, according to one aspect of the disclosure, the above method includes:

receiving a first signaling.

Herein, the first signaling is used for determining at least one of a candidate antenna port group set, a first candidate vector group set or a second candidate vector group set; the first antenna port group is one candidate antenna port group in the candidate antenna port group set; the first vector group is one first candidate vector group in the first candidate vector group set; and the second vector group is one second candidate vector group in the second candidate vector group set.

In one embodiment, the first candidate vector group set includes a positive integer number of first candidate vector groups.

In one embodiment, the second candidate vector group set includes a positive integer number of second candidate vector groups.

In one embodiment, the first signaling is a Radio Resource Control (RRC) signaling.

In one embodiment, the first signaling is cell-specific.

In one embodiment, the first signaling is TRP-specific.

In one embodiment, the first signaling is transmitted through a broadcast message.

The disclosure provides a method in a base station for multi-antenna transmission, wherein the method includes:

receiving a first radio signal in a first time interval, and transmitting a second radio signal in a second time interval; and transmitting a third radio signal in a third time interval.

Herein, the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the multi-antenna related receiving refers to generation of a beamforming matrix for receiving by a transmitter of the first radio signal.

In one embodiment, the multi-antenna related receiving refers to a receiving by a transmitter of the first radio signal employing one multi-antenna transmission scheme in SFBC, STBC, Precoder Cycling or Transmit beamforming.

In one embodiment, the multi-antenna related receiving refers to an antenna virtualization for receiving corresponding to a transmitter of the first radio signal.

Specifically, according to one aspect of the disclosure, the above method is characterized in that: the first information is used for determining at least one of a first antenna port group or an index of a first vector group, the first antenna port group includes a positive integer number of antenna port(s), and the first vector group includes a positive integer number of vector(s) used for an Rx-beam.

Specifically, according to one aspect of the disclosure, the above method is characterized in that: the second information indicates an index of a second vector group, and the second vector group includes a positive integer number of vector(s) used for an Rx-beam.

Specifically, according to one aspect of the disclosure, the above method is characterized in that: the first time interval and the second time interval are before the third time interval respectively. If the second time interval belongs to a first time window, the target information is the second information; otherwise, the target information is the first information. The first time window is before the third time interval.

Specifically, according to one aspect of the disclosure, the above method includes:

transmitting a first signaling.

Herein, the first signaling is used for determining at least one of a candidate antenna port group set, a first candidate vector group set or a second candidate vector group set; the first antenna port group is one candidate antenna port group in the candidate antenna port group set; the first vector group is one first candidate vector group in the first candidate vector group set; and the second vector group is one second candidate vector group in the second candidate vector group set.

In one embodiment, the candidate antenna port group set includes a positive integer number of candidate antenna port group(s).

In one subembodiment, the positive integer number of candidate antenna port group(s) correspond to a positive integer number of Tx-beams of the base station.

In one embodiment, the first candidate vector group set includes M1 first candidate vector groups, and the M1 first candidate vector groups correspond to M1 Rx-beams of a transmitter of the first information.

In one embodiment, the second candidate vector group set includes M1 second candidate vector groups, and the M1 second candidate vector groups correspond to M1 Rx-beams of a transmitter of the first information.

In one embodiment, the first candidate vector group set includes M1 first candidate vector group(s), and the candidate antenna port group set includes M1 candidate antenna port group(s). The M1 is a positive integer.

In one subembodiment, the M1 candidate vector group(s) and the M1 first candidate vector group(s) are in one-to-one correspondence.

In one embodiment, the first vector group and the first antenna port group are one Beam Pair (BP).

In one embodiment, the second vector group and the first antenna port group are one BP.

The disclosure provides a UE for multi-antenna transmission, wherein the UE includes:

a first transceiver, to transmit a first radio signal in a first time interval, and to receive a second radio signal in a second time interval; and a first receiver, to monitor a third radio signal in a third time interval.

Herein, the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the above UE for multi-antenna transmission is characterized in that: the first information is used for determining at least one of a first antenna port group or an index of a first vector group, the first antenna port group includes a positive integer number of antenna port(s), and the first vector group includes a positive integer number of vector(s) used for an Rx-beam.

In one embodiment, the above UE for multi-antenna transmission is characterized in that: the second information indicates an index of a second vector group, and the second vector group includes a positive integer number of vector(s) used for an Rx-beam.

In one embodiment, the above UE for multi-antenna transmission is characterized in that: the first time interval and the second time interval are before the third time interval respectively. If the second time interval belongs to a first time window, the target information is the second information; otherwise, the target information is the first information. The first time window is before the third time interval.

In one embodiment, the above UE for multi-antenna transmission is characterized in that: the first transceiver further receives a first signaling. The first signaling is used for determining at least one of a candidate antenna port group set, a first candidate vector group set or a second candidate vector group set. The first antenna port group is one candidate antenna port group in the candidate antenna port group set. The first vector group is one first candidate vector group in the first candidate vector group set. The second vector group is one second candidate vector group in the second candidate vector group set.

The disclosure provides a base station for multi-antenna transmission, wherein the base station includes:

a second transceiver, to receive a first radio signal in a first time interval, and to transmit a second radio signal in a second time interval; and a first transmitter, to transmit a third radio signal in a third time interval.

Herein, the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the above base station for multi-antenna transmission is characterized in that: the first information is used for determining at least one of a first antenna port group or an index of a first vector group, the first antenna port group includes a positive integer number of antenna port(s), and the first vector group includes a positive integer number of vector(s) used for an Rx-beam.

In one embodiment, the above base station for multi-antenna transmission is characterized in that: the second information indicates an index of a second vector group, and the second vector group includes a positive integer number of vector(s) used for an Rx-beam.

In one embodiment, the above base station for multi-antenna transmission is characterized in that: the first time interval and the second time interval are before the third time interval respectively. If the second time interval belongs to a first time window, the target information is the second information; otherwise, the target information is the first information. The first time window is before the third time interval.

In one embodiment, the above base station for multi-antenna transmission is characterized in that: the second transceiver further transmits a first signaling. The first signaling is used for determining at least one of a candidate antenna port group set, a first candidate vector group set or a second candidate vector group set. The first antenna port group is one candidate antenna port group in the candidate antenna port group set. The first vector group is one first candidate vector group in the first candidate vector group set. The second vector group is one second candidate vector group in the second candidate vector group set.

In one embodiment, compared with the prior art, the disclosure has the following technical advantages.

The UE determines the first information, thereby determining beam information of the third radio signal, without waiting for a confirmation from the base station; the switching speed of beams is improved to adapt to a changed beam direction, and performances of reception are improved.

A relationship is established in time domain between the first time interval and the third time interval, the above beam information based on a judgment of the UE takes effect in the third time interval only, and a probability of risk caused by the UE selecting an error beam is reduced.

Through the design of the first time window and the second information, the base station still plays a decisive role in determining the beam information of the UE, so as to ensure that, when there is an indication from the base station, the UE still works based on the indication from the base station.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
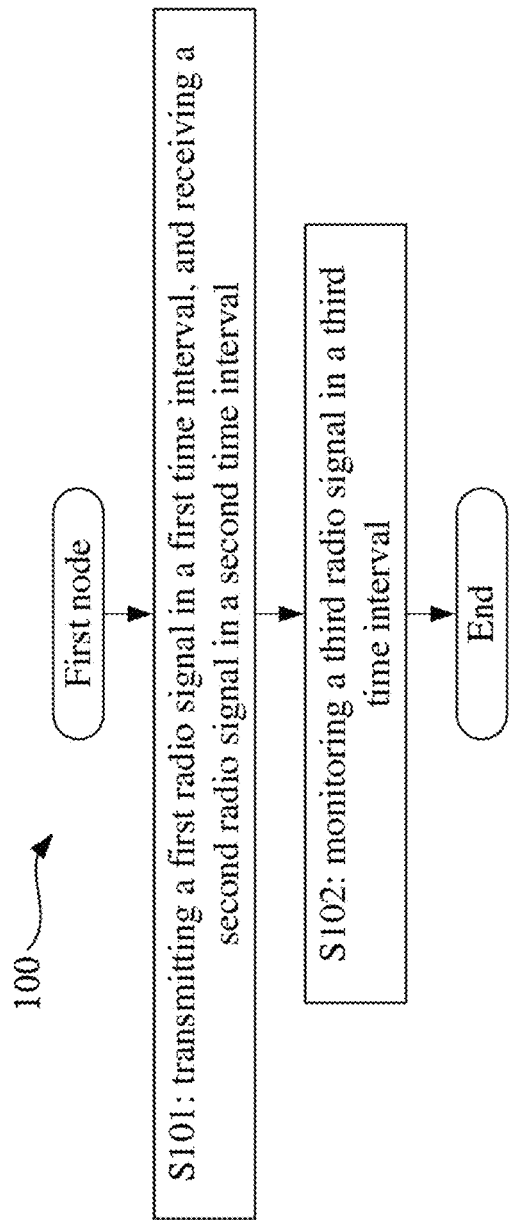
FIG. 1 is a flowchart of processing of a UE according to one embodiment of the disclosure.

Embodiment 1 illustrates an example of a flowchart of processing of a UE, as shown in FIG. 1. In 100 shown in FIG. 1, each box represents one step. In Embodiment 1, the UE in the disclosure transmits a first radio signal in a first time interval and receives a second radio signal in a second time interval in S101, and monitors a third radio signal in a third time interval in S102.

In Embodiment 1, the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

Embodiment 2

Figure 2:
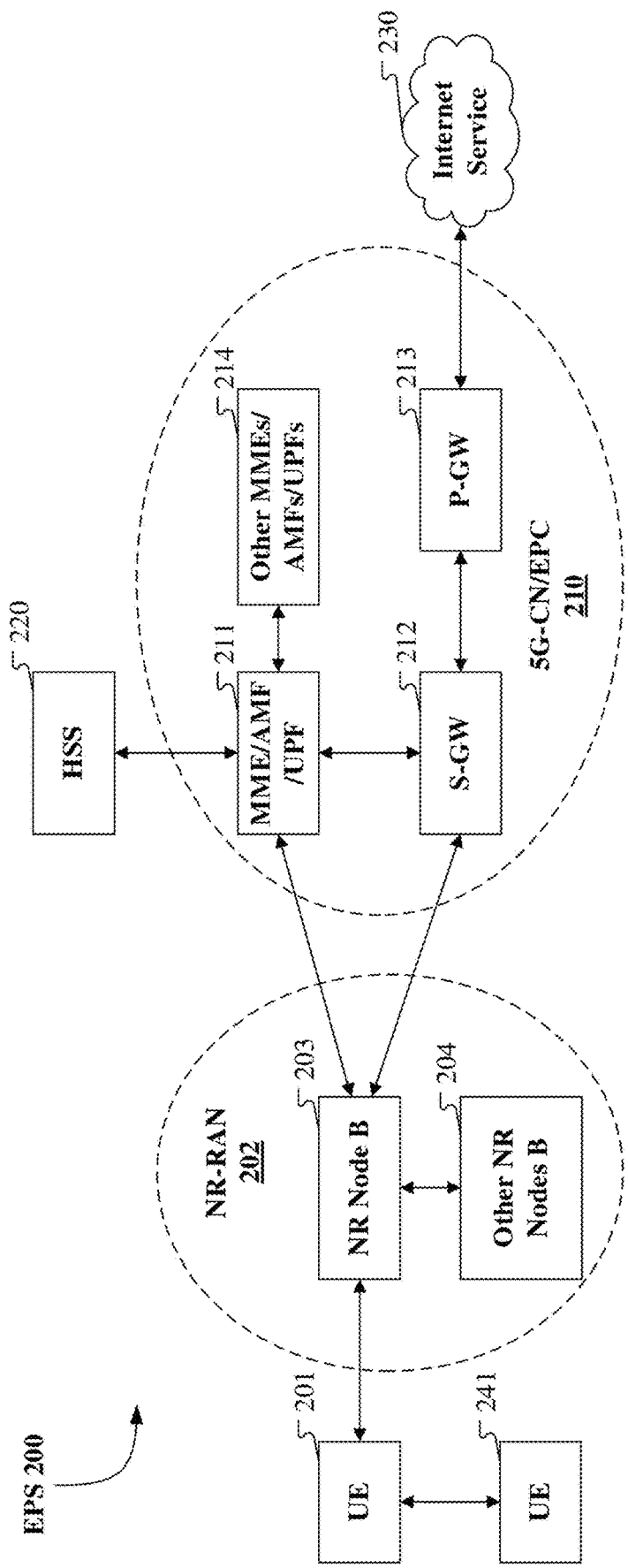
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, LTE and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

Embodiment 3

Figure 3:
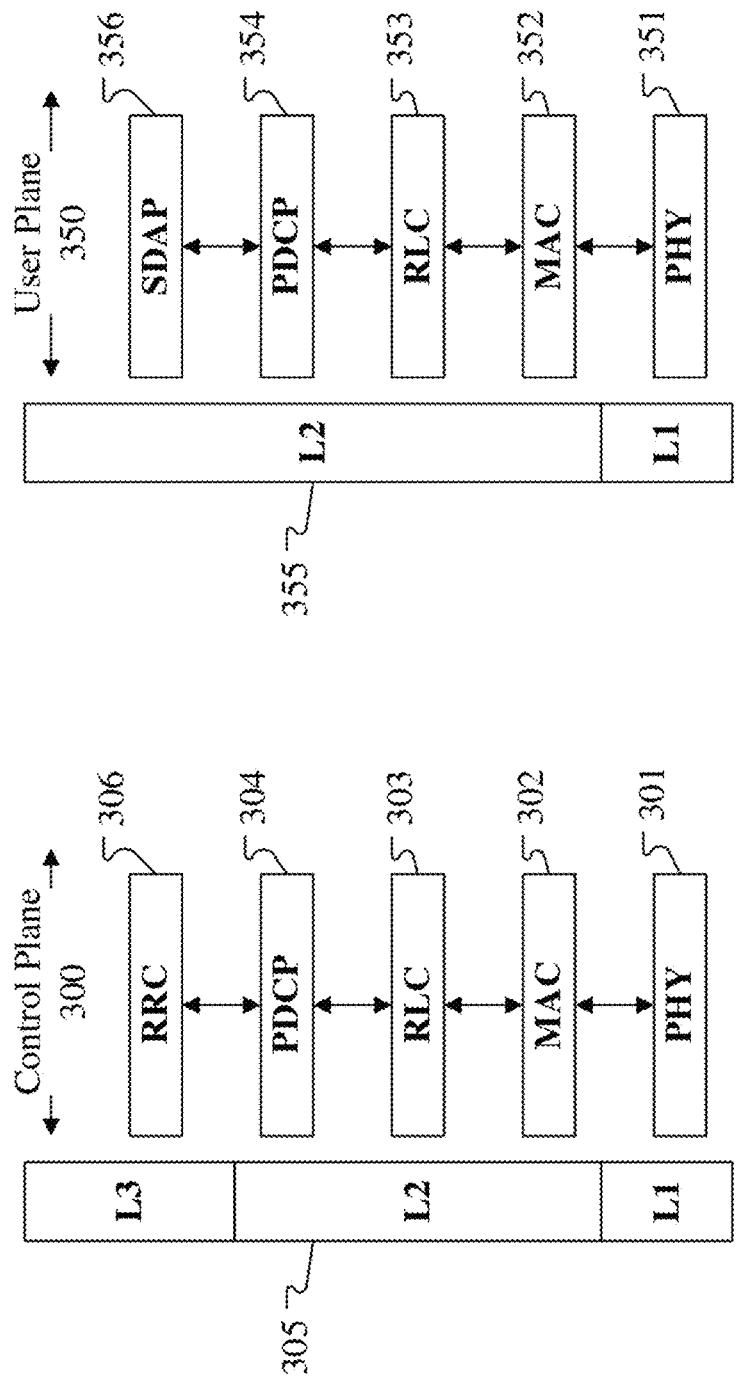
FIG. 3 is a diagram illustrating an embodiment of a radio protocol architecture of a user plane and a control plane according to one embodiment of the disclosure.

Embodiment 3 illustrates a diagram of an embodiment a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node (UE, gNB or RSU in V2X) and a second communication node (gNB, UE or RSU in V2X) or between two UEs is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first communication node and the second communication node and between two UEs over the PHY 301. The L2 layer 305 includes a Medium Access Control (MAC) sublayer 302, a Radio Link Control (RLC) sublayer 303, and a Packet Data Convergence Protocol (PDCP) sublayer 304, which are terminated at the second communication node. The PDCP sublayer 304 provides multiplexing between different radio bearers and logical channels. The PDCP sublayer 304 also provides security by encrypting packets and provides support for handover of the first communication node between the second communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication nodes. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node and the first communication node. The radio protocol architecture of the user plane 350 include a Layer 1 (L1 layer) and a Layer 2 (L2 layer); the radio protocol architecture for the first communication node and the second communication node in the user plane 350 on the PHY 301, the PDCP sublayer 354 in the L2 layer 305, the RLC sublayer 353 in the L2 layer 355 and the MAC sublayer 352 in the L2 layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node may include several higher layers above the L2 layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the UE in the disclosure.

In one embodiment, the radio protocol architecture shown in FIG. 3 is applicable to the base station in the disclosure.

Embodiment 4

Figure 4:
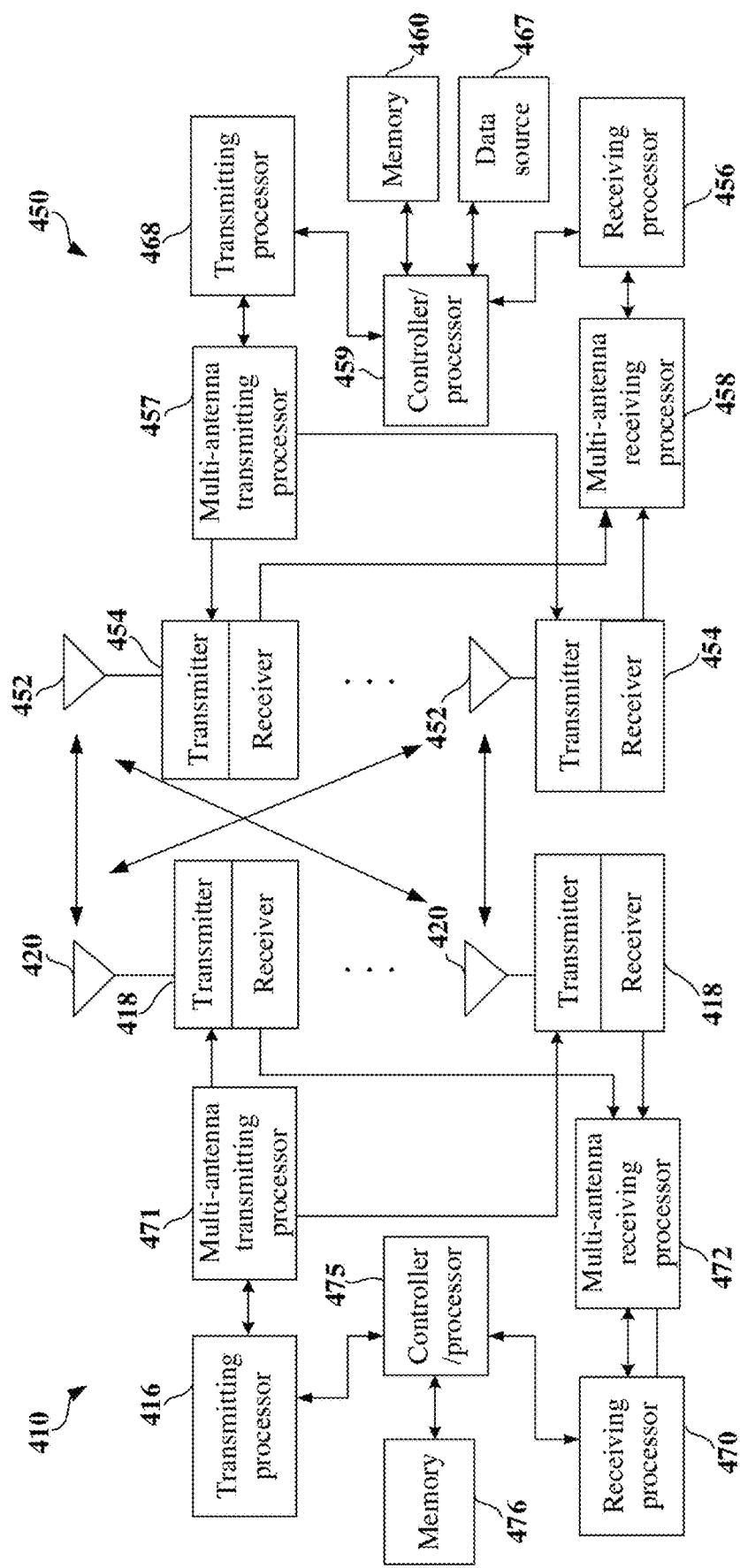
FIG. 4 is a diagram illustrating a UE and a base station according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least transmits a first radio signal in a first time interval, and receives a second radio signal in a second time interval; and monitors a third radio signal in a third time interval; wherein the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the first communication equipment 450 includes a memory that stores a computer readable instruction program. The computer readable instruction program generates an action when executed by at least one processor. The action includes: transmitting a first radio signal in a first time interval, and receiving a second radio signal in a second time interval; and monitoring a third radio signal in a third time interval; wherein the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least receives a first radio signal in a first time interval, and transmits a second radio signal in a second time interval; and transmits a third radio signal in a third time interval; wherein the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the second communication equipment 410 includes a memory that stores a computer readable instruction program. The computer readable instruction program generates an action when executed by at least one processor. The action includes: receiving a first radio signal in a first time interval, and transmitting a second radio signal in a second time interval; and transmitting a third radio signal in a third time interval; wherein the first radio signal includes first information, and the second radio signal includes second information; target information is used for a multi-antenna related receiving in the third time interval; a time-domain position of the second time interval is used for determining whether the target information is the first information or the second information; and a time-domain position of the third time interval is associated to a time-domain position of the first time interval.

In one embodiment, the first communication equipment 450 corresponds to the UE in the disclosure.

In one embodiment, the second communication equipment 410 corresponds to the base station in the disclosure.

In one embodiment, the first communication equipment 450 is one UE.

In one embodiment, the second communication equipment 410 is one base station.

In one embodiment, at least one of the antenna 452, the transmitter 454, the multi-antenna transmitting processor 457, the transmitting processor 468 and the controller/processor 459 is used for transmitting a first radio signal in a first time interval; and at least one of the antenna 420, the receiver 418, the multi-antenna receiving processor 472, the receiving processor 470 and the controller/processor 475 is used for receiving a first radio signal in a first time interval.

In one embodiment, at least one of the antenna 452, the receiver 454, the multi-antenna receiving processor 458, the receiving processor 456 and the controller/processor 459 is used for receiving a second radio signal in a second time interval; and at least one of the antenna 420, the transmitter 418, the multi-antenna transmitting processor 471, the transmitting processor 416 and the controller/processor 475 is used for transmitting a second radio signal in a second time interval.

In one embodiment, at least one of the antenna 452, the receiver 454, the multi-antenna receiving processor 458, the receiving processor 456 and the controller/processor 459 is used for monitoring a third radio signal in a third time interval; and at least one of the antenna 420, the transmitter 418, the multi-antenna transmitting processor 471, the transmitting processor 416 and the controller/processor 475 is used for transmitting a third radio signal in a third time interval.

In one embodiment, at least one of the antenna 452, the receiver 454, the multi-antenna receiving processor 458, the receiving processor 456 and the controller/processor 459 is used for receiving a first signaling; and at least one of the antenna 420, the transmitter 418, the multi-antenna transmitting processor 471, the transmitting processor 416 and the controller/processor 475 is used for transmitting a first signaling.

Embodiment 5

Figure 5:
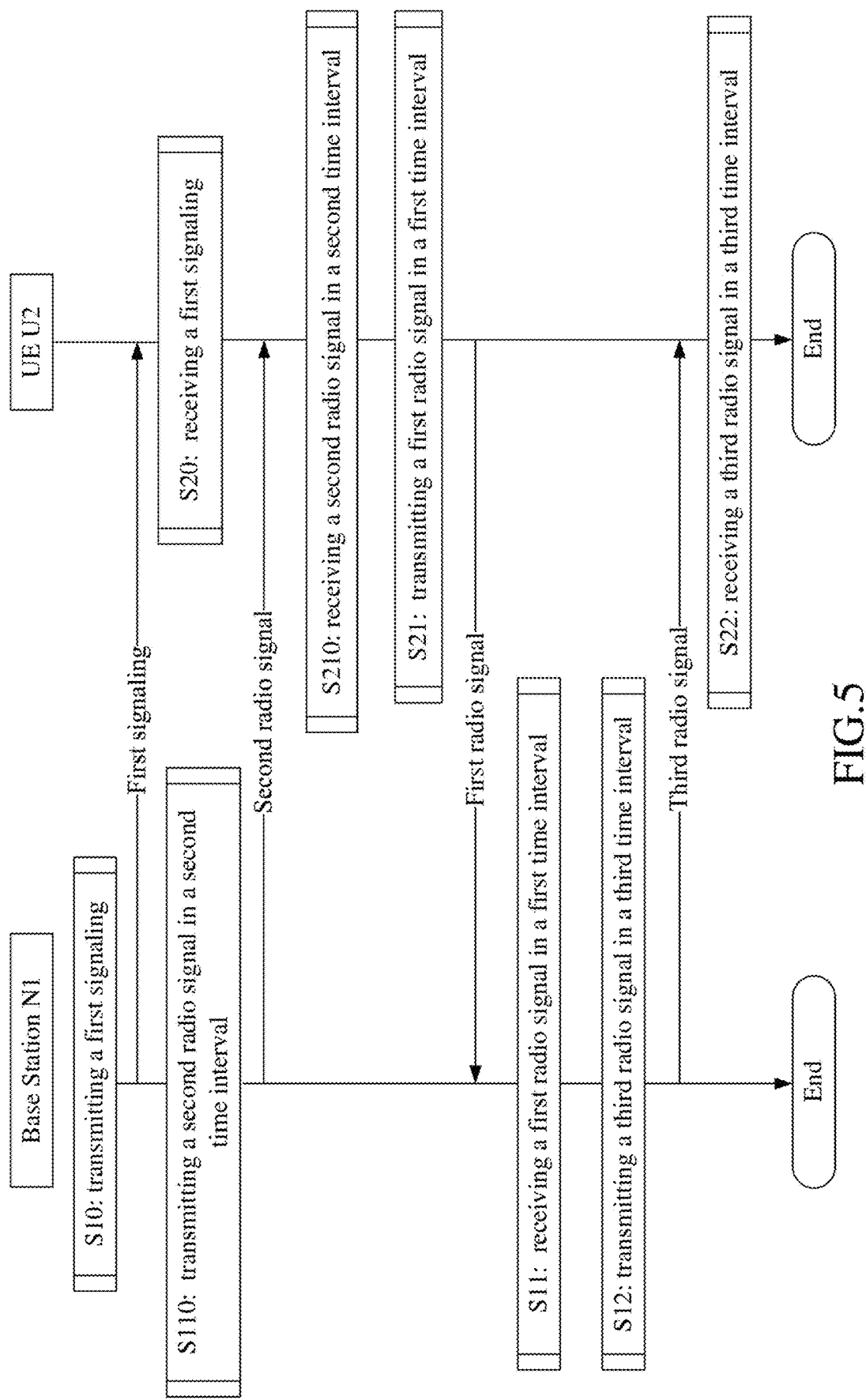
FIG. 5 is a flowchart of wireless transmission according to one embodiment of the disclosure, in which a second time interval is before a first time interval.

Embodiment 5 illustrates an example of a flowchart of wireless transmission, as shown in FIG. 5. In FIG. 5, a base station N1 is a maintenance base station for a serving cell of a UE U2.

The base station N1 transmits a first signaling in S10, transmits a second radio signal in a second time interval in S110, receives a first radio signal in a first time interval in S11, and transmits a third radio signal in a third time interval in S12.

The UE U2 receives a first signaling in S20, receives a second radio signal in a second time interval in S210, transmits a first radio signal in a first time interval in S21, and monitors a third radio signal in a third time interval in S22.

In Embodiment 5, the second time interval is before the first time interval. The first radio signal includes first information, and the second radio signal includes second information. Target information is used for a multi-antenna related receiving in the third time interval. A time-domain position of the second time interval is used for determining whether the target information is the first information or the second information. A time-domain position of the third time interval is associated to a time-domain position of the first time interval. The first information is used for determining at least one of a first antenna port group or an index of a first vector group, the first antenna port group includes a positive integer number of antenna port(s), and the first vector group includes a positive integer number of vector(s) used for an Rx-beam. The second information indicates an index of a second vector group, and the second vector group includes a positive integer number of vector(s) used for an Rx-beam. The first time interval and the second time interval are before the third time interval respectively. If the second time interval belongs to a first time window, the target information is the second information; otherwise, the target information is the first information. The first time window is before the third time interval. The first signaling is used for determining at least one of a candidate antenna port group set, a first candidate vector group set or a second candidate vector group set. The first antenna port group is one candidate antenna port group in the candidate antenna port group set. The first vector group is one first candidate vector group in the first candidate vector group set. The second vector group is one second candidate vector group in the second candidate vector group set.

In one embodiment, a physical layer channel corresponding to the first radio signal is one of a Physical Uplink Control Channel (PUCCH), a Short Latency Physical Uplink Control Channel (SPUCCH) or a New Radio Physical Uplink Control Channel (NR-PUCCH).

In one embodiment, a physical layer channel corresponding to the second radio signal is one of a Physical Downlink Control Channel (PDCCH), a Short Latency Physical Downlink Control Channel (SPDCCH) or a NR-PDCCH (New Radio Physical Downlink Control Channel (NR-PDCCH).

In one embodiment, a physical layer channel corresponding to the third radio signal is one of a PDCCH, an SPDCCH or an NR-PDCCH.

In one embodiment, in time axis, the first time interval is before the second time interval.

In one embodiment, in time axis, the first time interval is behind the second time interval.

In one embodiment, the first information is used for determining at least one of a first antenna port group or an index of a first vector group, the first antenna port group includes a positive integer number of antenna port(s), and the first vector group includes a positive integer number of vector(s) used for an Rx-beam.

In one embodiment, the second information indicates an index of a second vector group, and the second vector group includes a positive integer number of vector(s) used for an Rx-beam In one embodiment, the first time interval and the second time interval are before the third time interval respectively. If the second time interval belongs to a first time window, the target information is the second information; otherwise, the target information is the first information. The first time window is before the third time interval.

In one embodiment, at least one of a start time of the first time window or an end time of the first time window is associated with a time-domain position of the first time interval.

In one embodiment, at least one of a start time of the first time window or an end time of the first time window is indicated implicitly by the first time interval.

In one embodiment, the antenna port in the first antenna port group is used for transmitting a Channel Status Information Reference Signal (CSI-RS).

Embodiment 6

Figure 6:
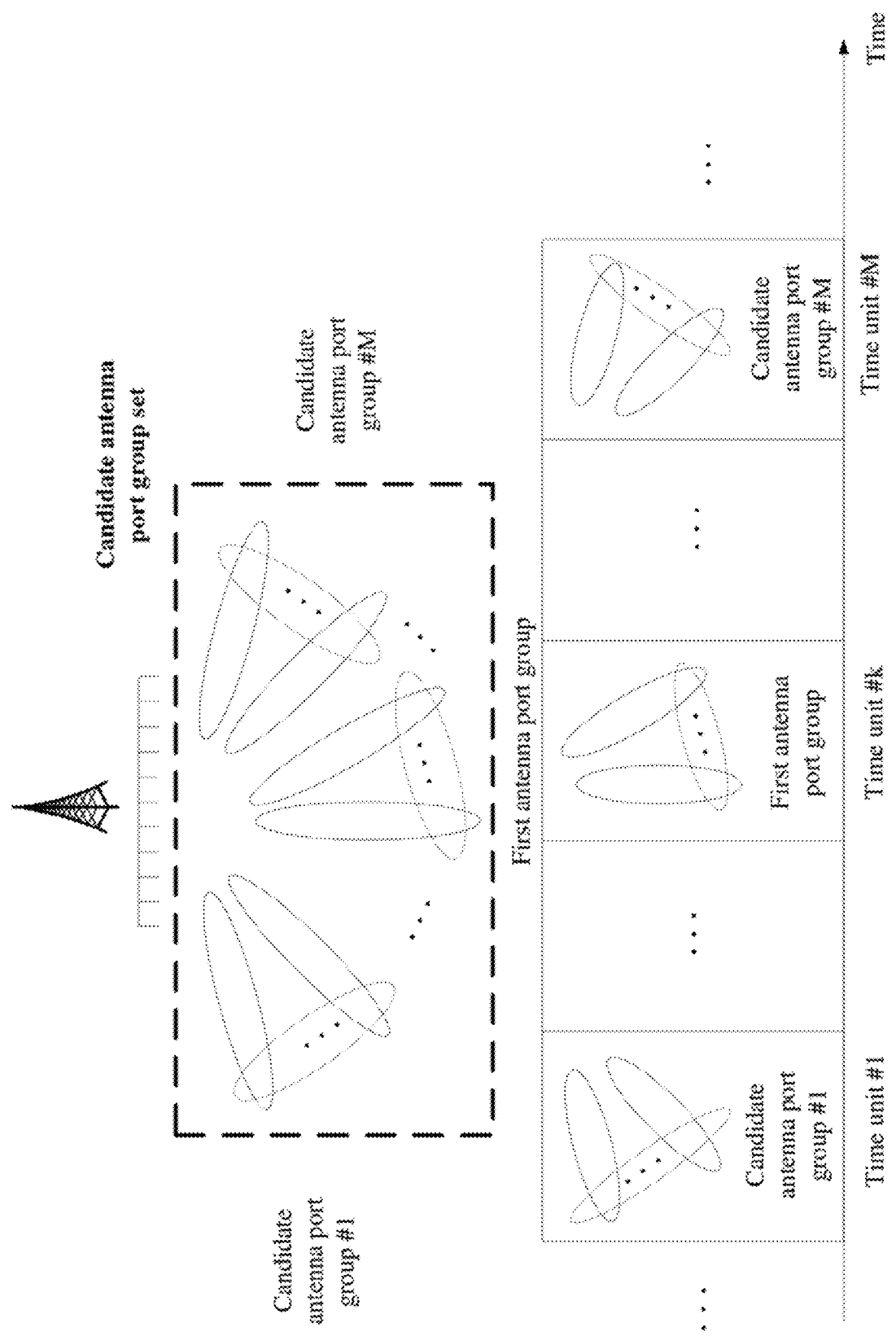
FIG. 6 is a diagram illustrating a first antenna port group according to one embodiment of the disclosure.

Embodiment 6 illustrates an example of a diagram of a first antenna port group according to the disclosure, as shown in FIG. 6. In FIG. 6, the first antenna port group belongs to a candidate antenna port group set, and the candidate antenna port group set includes M candidate antenna port groups. The M candidate antenna port groups are one-to-one corresponding to M time units. A dashed box shown in FIG. 6 corresponds to the candidate antenna port group set.

In one subembodiment, different candidate antenna port groups include a same number of antenna ports.

In one subembodiment, at least two different candidate antenna port groups include different numbers of antenna ports.

In one subembodiment, any one of the M time units occupies a same number of Orthogonal Frequency Division Multiplexing (OFDM) symbols.

In one subembodiment, two of the M time units occupy different numbers of OFDM symbols.

In one subembodiment, the M time units constitute one of a mini-slot, a slot or a subframe.

In one subembodiment, a duration of the time unit in time domain is less than the time interval described in the disclosure.

Embodiment 7

Figure 7:
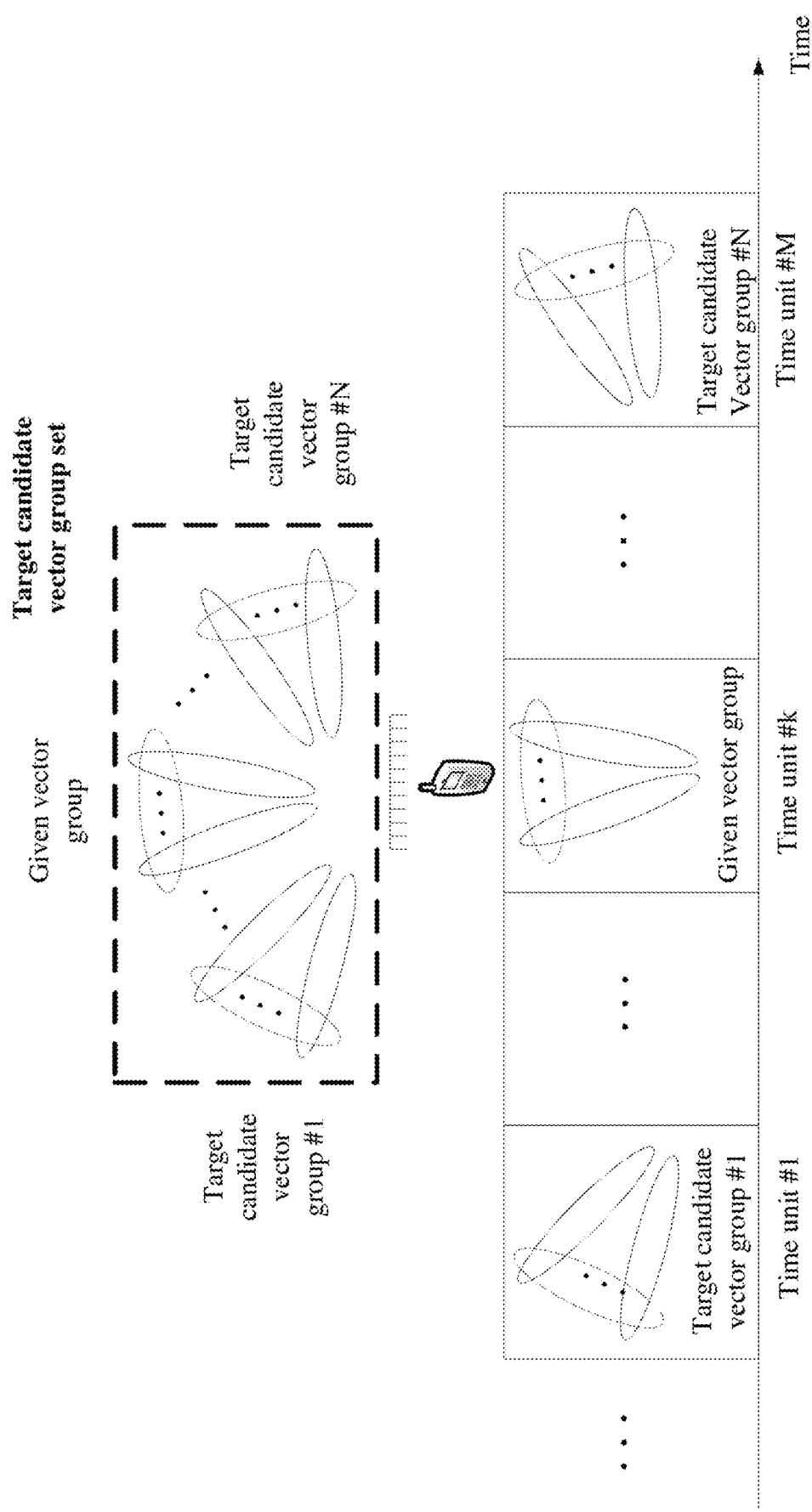
FIG. 7 is a diagram illustrating a given vector group according to one embodiment of the disclosure.

Embodiment 7 illustrates an example of a diagram of a given vector group according to the disclosure, as shown in FIG. 7. In FIG. 7, the given vector group belongs to a target candidate vector group set, and the target candidate vector group set includes N target candidate vector groups. The N target candidate vector groups are one-to-one corresponding to N time units. A dashed box shown in FIG. 7 corresponds to the target candidate vector group set.

In one subembodiment, the given vector group is the first vector group in the disclosure, the target candidate vector group set is the first candidate vector group set in the disclosure, and the target candidate vector group is the first candidate vector group in the disclosure.

In one subembodiment, the given vector group is the second vector group in the disclosure, the target candidate vector group set is the second candidate vector group set in the disclosure, and the target candidate vector group is the second candidate vector group in the disclosure.

In one subembodiment, different target candidate vector groups include a same number of antenna ports.

In one subembodiment, at least two different target candidate vector groups include different numbers of antenna ports.

In one subembodiment, any one of the N time units occupies a same number of OFDM symbols.

In one subembodiment, two of the N time units occupy different numbers of OFDM symbols.

In one subembodiment, the N time units constitute one of a mini-slot, a slot or a subframe.

In one subembodiment, a duration of the time unit in time domain is less than the time interval described in the disclosure.

Embodiment 8

Figure 8:
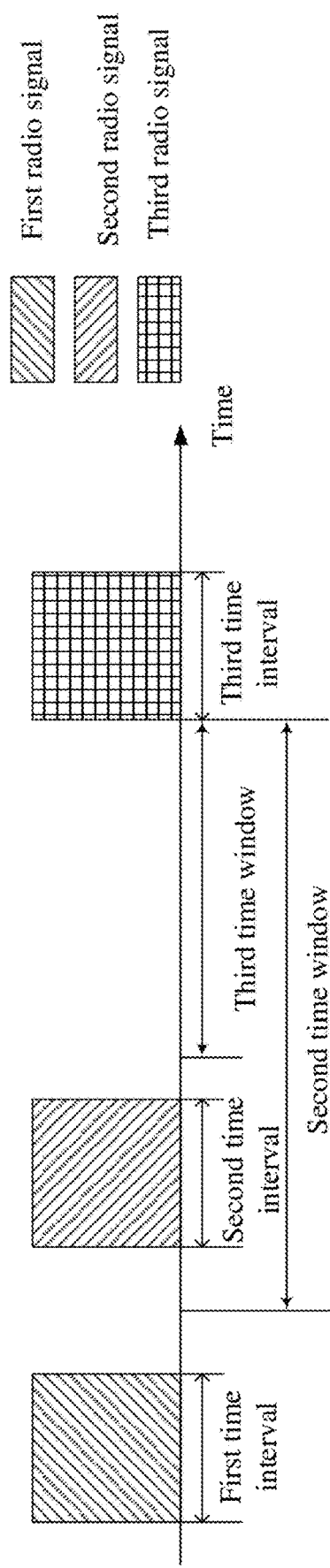
FIG. 8 is a diagram illustrating a first time interval, a second time interval and a third time interval according to one embodiment of the disclosure.

Embodiment 8 illustrates an example of a diagram of a first time interval, a second time interval and a third time interval according to the disclosure. As shown in FIG. 8, the first time interval, the second time interval and the third time interval are sequentially arranged in time domain in a chronological order. FIG. 8 also shows a second time window and a third time window. The UE in the disclosure transmits a first radio signal in the first time interval, receives a second radio signal in the second time interval and monitors a third radio signal in the third time interval. The first radio signal includes first information, and the second radio signal includes second information. Target information is used for a multi-antenna related receiving in the third time interval. The first time window in the disclosure is one of the second time window or the third time window.

In one subembodiment, the first time window is the second time window, and the target information is the second information.

In one subembodiment, the first time window is the third time window, and the target information is the first information.

Embodiment 9

Figure 9:
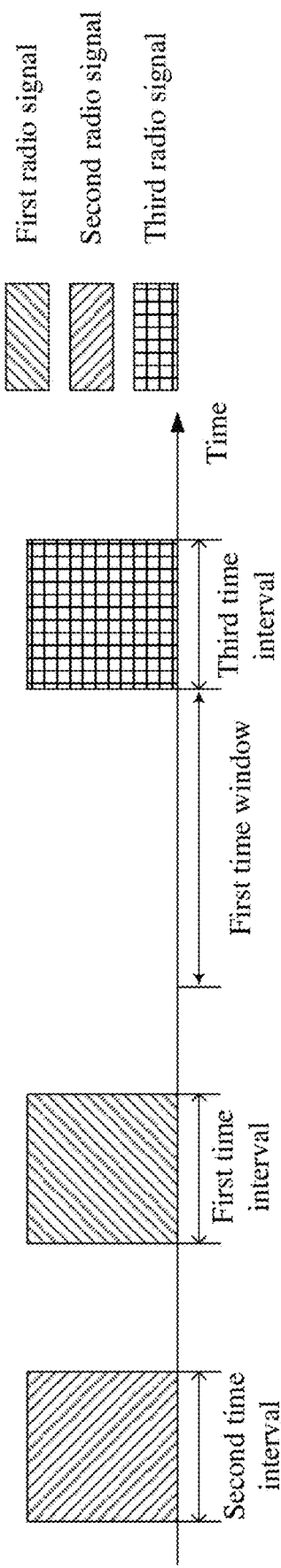
FIG. 9 is a diagram illustrating a first time interval, a second time interval and a third time interval according to another embodiment of the disclosure.

Embodiment 9 illustrates an example of a diagram of a first time interval, a second time interval and a third time interval according to the disclosure. As shown in FIG. 9, the second time interval, the first time interval and the third time interval are sequentially arranged in time domain in a chronological order. FIG. 9 also shows the first time window in the disclosure. The UE in the disclosure receives a second radio signal in the second time interval, transmits a first radio signal in the first time interval and monitors a third radio signal in the third time interval. The first radio signal includes first information, and the second radio signal includes second information. Target information is used for a multi-antenna related receiving in the third time interval.

In one subembodiment, the target information is the first information.

In one subembodiment, the second information is indicated through a higher-layer signaling.

In one subembodiment, a physical layer channel corresponding to the second radio signal is one of a Physical Downlink Shared Channel (PDSCH), a Short Latency PDSCH (SPDSCH) or a New Radio-PDSCH (NR-PDSCH).

Embodiment 10

Figure 10:
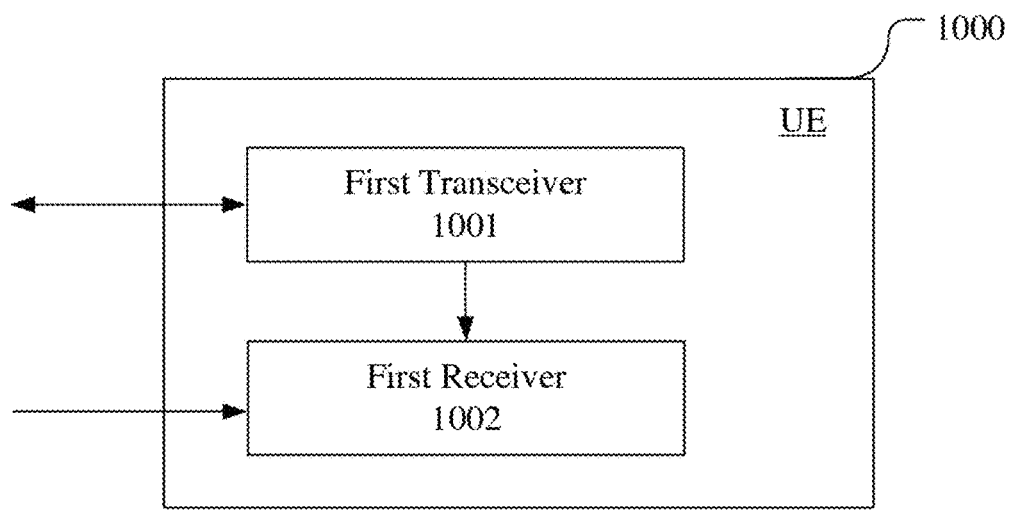
FIG. 10 is a structure block diagram illustrating a processing device in a UE according to one embodiment of the disclosure.

Embodiment 10 illustrates an example of a structure block diagram of a processing device in a UE, as shown in FIG. 10. In FIG. 10, the processing device 1000 in the UE includes a first transceiver 1001 and a first receiver 1002.

The first transceiver 1001 transmits a first radio signal in a first time interval, and receives a second radio signal in a second time interval.

The first receiver 1002 monitors a third radio signal in a third time interval.

In Embodiment 10, the first radio signal includes first information, and the second radio signal includes second information. Target information is used for a multi-antenna related receiving in the third time interval. A time-domain position of the second time interval is used for determining whether the target information is the first information or the second information. A time-domain position of the third time interval is associated to a time-domain position of the first time interval. The first information is used for determining at least one of a first antenna port group or an index of a first vector group, the first antenna port group includes a positive integer number of antenna port(s), and the first vector group includes a positive integer number of vector(s) used for an Rx-beam. The second information indicates an index of a second vector group, and the second vector group includes a positive integer number of vector(s) used for an Rx-beam. The first time interval and the second time interval are before the third time interval respectively. If the second time interval belongs to a first time window, the target information is the second information; otherwise, the target information is the first information. The first time window is before the third time interval.

In one embodiment, the first transceiver 1001 receives a first signaling. The first signaling is used for determining at least one of a candidate antenna port group set, a first candidate vector group set or a second candidate vector group set. The first antenna port group is one candidate antenna port group in the candidate antenna port group set. The first vector group is one first candidate vector group in the first candidate vector group set. The second vector group is one second candidate vector group in the second candidate vector group set.

In one embodiment, the third radio signal is used for transmitting a DCI, and the first receiver 1002 performs blind decoding of the third radio signal in the third time interval.

In one embodiment, the third radio signal is one of a PDCCH, an SPDCCH or an NR-PDCCH specific to the UE.

In one embodiment, the first information is used for determining at least one of a first antenna port group or an index of a first vector group, the first antenna port group includes a positive integer number of antenna port(s), and the first vector group includes a positive integer number of vector(s) used for an Rx-beam.

In one embodiment, the second information indicates an index of a second vector group, and the second vector group includes a positive integer number of vector(s) used for an Rx-beam.

In one embodiment, the first time interval and the second time interval are before the third time interval respectively. If the second time interval belongs to the first time window, the target information is the second information; otherwise, the target information is the first information. The first time window is before the third time interval.

In one embodiment, the first transceiver 1001 includes at least the former six of the antenna 452, the transmitter/receiver 454, the multi-antenna transmitting processor 457, the multi-antenna receiving processor 458, the transmitting processor 458, the receiving processor 456 and the controller/processor 459 illustrated in Embodiment 4.

In one embodiment, the first receiver 1002 includes at least the former four of the antenna 452, the receiver 454, the multi-antenna receiving processor 458, the receiving processor 456 and the controller/processor 459 illustrated in Embodiment 4.

Embodiment 11

Figure 11:
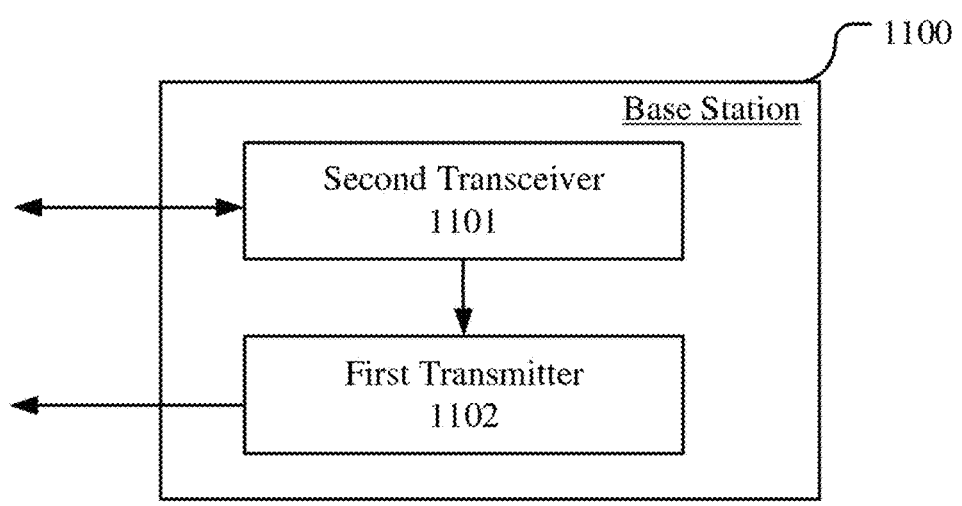
FIG. 11 is a structure block diagram illustrating a processing device in a base station according to one embodiment of the disclosure.

Embodiment 11 illustrates an example of a structure block diagram of a processing device in a base station, as shown in FIG. 11. The processing device 1100 in the base station includes a second transceiver 1101 and a first transmitter 1102.

The second transceiver 1101 receives a first radio signal in a first time interval, and transmits a second radio signal in a second time interval.

The first transmitter 1102 transmits a third radio signal in a third time interval.

In Embodiment 11, the first radio signal includes first information, and the second radio signal includes second information. Target information is used for a multi-antenna related receiving in the third time interval. A time-domain position of the second time interval is used for determining whether the target information is the first information or the second information. A time-domain position of the third time interval is associated to a time-domain position of the first time interval. The first information is used for determining at least one of a first antenna port group or an index of a first vector group, the first antenna port group includes a positive integer number of antenna port(s), and the first vector group includes a positive integer number of vector(s) used for an Rx-beam. The second information indicates an index of a second vector group, and the second vector group includes a positive integer number of vector(s) used for an Rx-beam. The first time interval and the second time interval are before the third time interval respectively. If the second time interval belongs to a first time window, the target information is the second information; otherwise, the target information is the first information. The first time window is before the third time interval.

In one embodiment, the second transceiver 1101 transmits a first signaling. The first signaling is used for determining at least one of a candidate antenna port group set, a first candidate vector group set or a second candidate vector group set. The first antenna port group is one candidate antenna port group in the candidate antenna port group set. The first vector group is one first candidate vector group in the first candidate vector group set. The second vector group is one second candidate vector group in the second candidate vector group set.

In one embodiment, the third radio signal is one of a PDCCH, an SPDCCH or an NR-PDCCH specific to the UE.

In one embodiment, the first information is used for determining at least one of a first antenna port group or an index of a first vector group, the first antenna port group includes a positive integer number of antenna port(s), and the first vector group includes a positive integer number of vector(s) used for an Rx-beam.

In one embodiment, the second information indicates an index of a second vector group, and the second vector group includes a positive integer number of vector(s) used for an Rx-beam.

In one embodiment, the first time interval and the second time interval are before the third time interval respectively. If the second time interval belongs to a first time window, the target information is the second information; otherwise, the target information is the first information. The first time window is before the third time interval.

In one embodiment, the second transceiver 1201 includes at least the former six of the antenna 420, the transmitter/receiver 418, the multi-antenna transmitting processor 471, the multi-antenna receiving processor 472, the transmitting processor 416, the receiving processor 470 and the controller/processor 475 illustrated in Embodiment 4.

In one embodiment, the first transmitter 1202 includes at least the former four of the antenna 420, the transmitter 418, the multi-antenna transmitting processor 471, the transmitting processor 416 and the controller/processor 475 illustrated in Embodiment 4.

Embodiment 12

Figure 12:
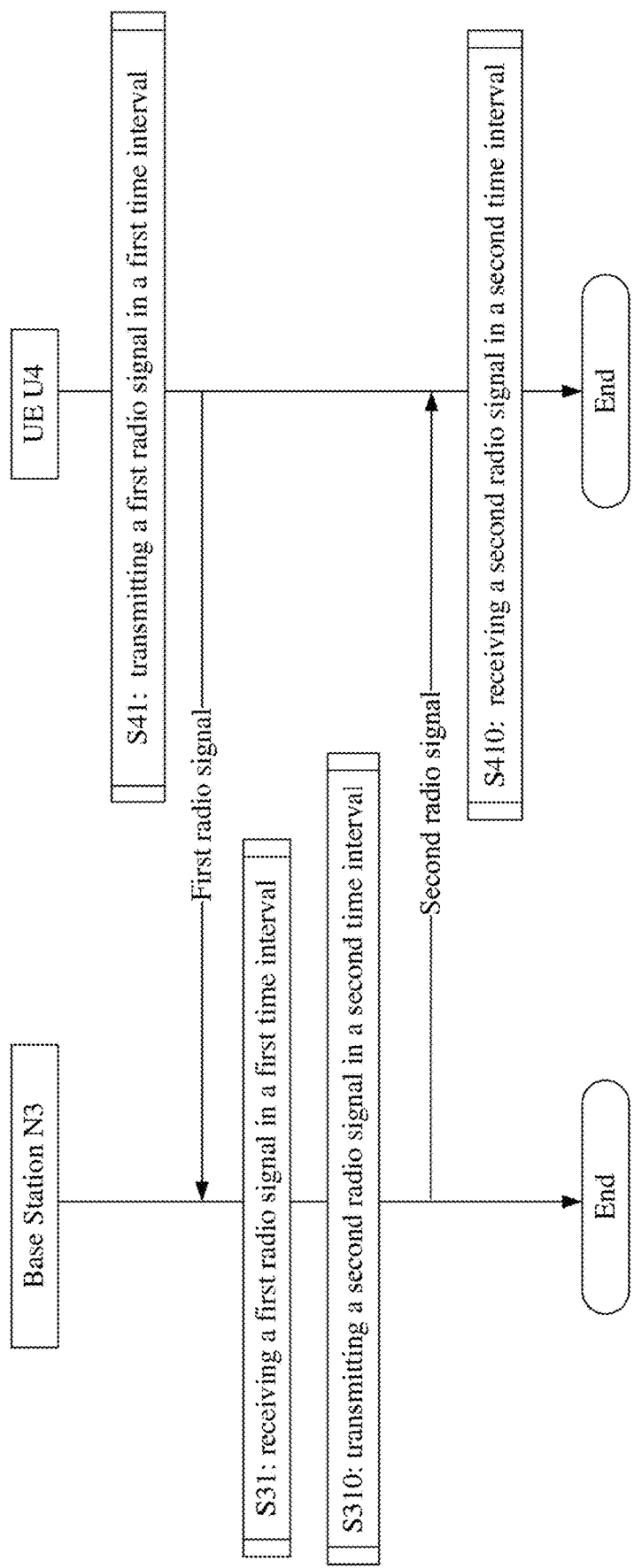
FIG. 12 is a flowchart of wireless transmission according to one embodiment of the disclosure, in which a second time interval is behind a first time interval.

Embodiment 12 illustrates an example of a flowchart of wireless transmission, as shown in FIG. 12. In FIG. 12, a base station N3 is a maintenance base station for a serving cell of a UE U4.

The base station N3 receives a first radio signal in a first time interval in S31, and transmits a second radio signal in a second time interval in S310.

The UE U4 transmits a first radio signal in a first time interval in S41, and receives a second radio signal in a second time interval in S410.

In Embodiment 12, the first time interval is before the second time interval.

In one embodiment, the first time interval and the second time interval include a positive integer number of OFDM symbols respectively.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for multi-antenna transmission, comprising:
    transmitting a first radio signal in a first time interval, and receiving a second radio signal in a second time interval; and
    monitoring a third radio signal in a third time interval;
    wherein the first radio signal comprises first information, and the second radio signal comprises second information; target information is used for a multi-antenna related receiving in the third time interval; a time-domain position of the second time interval is used for determining whether the target information is the first information or the second information; and a time-domain position of the third time interval is associated to a time-domain position of the first time interval; the multi-antenna related receiving refers to generation of a beamforming matrix for receiving; or the multi-antenna related receiving refers to a receiving corresponding to one multi-antenna transmission scheme in SFBC, STBC, Precoder Cycling or Transmit beamforming; or the multi-antenna related receiving refers to an antenna virtualization for receiving; the target information is provided by the UE when the target information is the first information, the target information is provided by a base station when the target information is the second information; the base station is a transmitter of the second radio signal; the first time interval and the second time interval are before the third time interval respectively, a first time window is before the third time interval; if the second time interval belongs to the first time window, the target information is the second information, and the UE determines beam information of the third radio signal according to the indication from the base station; if the second time interval does not belong to the first time window, the target information is the first information, the UE receives the third radio signal according to its own reporting in the first information; the third radio signal is used for transmitting a Downlink Control Information (DCI), and the UE performs blind decoding of the third radio signal in the third time interval; a physical layer channel corresponding to the third radio signal is Physical Downlink Control Channel (PDCCH).

2. The method according to claim 1, wherein the first information is used for determining at least one of a first antenna port group or an index of a first vector group, the first antenna port group comprises a positive integer number of antenna port(s), and the first vector group comprises a positive integer number of vector(s) used for an Rx-beam; a transport channel corresponding to the second radio signal is a Downlink Shared Channel (DL-SCH); the antenna port in the first antenna port group is used for transmitting a Channel Status Information Reference Signal (CSI-RS).

3. The method according to claim 1, wherein the second information indicates an index of a second vector group, and the second vector group comprises a positive integer number of vector(s) used for an Rx-beam.

4. The method according to claim 1, wherein the first information is dynamic, the first information is carried by a physical layer signaling.

5. The method according to claim 1, comprising:
    receiving a first signaling;
    wherein the first information is used for determining at least one of a first antenna port group or an index of a first vector group, the first antenna port group comprises a positive integer number of antenna port(s), and the first vector group comprises a positive integer number of vector(s) used for an Rx-beam; the second information indicates an index of a second vector group, and the second vector group comprises a positive integer number of vector(s) used for an Rx-beam; the first signaling is used for determining at least one of a candidate antenna port group set, a first candidate vector group set or a second candidate vector group set; the first antenna port group is one candidate antenna port group in the candidate antenna port group set; the first vector group is one first candidate vector group in the first candidate vector group set; and the second vector group is one second candidate vector group in the second candidate vector group set the UE performs the receiving of the first signaling prior to both the first time interval and the second time interval.

6. A method in a base station for multi-antenna transmission, comprising:
receiving a first radio signal in a first time interval, and transmitting a second radio signal in a second time interval; and
transmitting a third radio signal in a third time interval;
wherein the first radio signal comprises first information, and the second radio signal comprises second information; target information is used for a multi-antenna related receiving in the third time interval; a time-domain position of the second time interval is used for determining whether the target information is the first information or the second information; and a time-domain position of the third time interval is associated to a time-domain position of the first time interval; the multi-antenna related receiving refers to generation of a beamforming matrix for receiving; or the multi-antenna related receiving refers to a receiving corresponding to one multi-antenna transmission scheme in SFBC, STBC, Precoder Cycling or Transmit beamforming; or the multi-antenna related receiving refers to an antenna virtualization for receiving; the target information is provided by a UE when the target information is the first information; the target information is provided by the base station when the target information is the second information; the UE is a transmitter of the first radio signal; the first time interval and the second time interval are before the third time interval respectively, a first time window is before the third time interval; if the second time interval belongs to the first time window, the target information is the second information, and the UE determines beam information of the third radio signal according to the indication from the base station; if the second time interval does not belong to the first time window, the target information is the first information, the UE receives the third radio signal according to its own reporting in the first information; the third radio signal is used for transmitting a Downlink Control Information (DCI), and the UE performs blind decoding of the third radio signal in the third time interval; a physical layer channel corresponding to the third radio signal is Physical Downlink Control Channel (PDCCH).

7. The method according to claim 6, wherein the first information is used for determining at least one of a first antenna port group or an index of a first vector group, the first antenna port group comprises a positive integer number of antenna port(s), and the first vector group comprises a positive integer number of vector(s) used for an Rx-beam; a transport channel corresponding to the second radio signal is a Downlink Shared Channel (DL-SCH); the antenna port in the first antenna port group is used for transmitting a Channel Status Information Reference Signal (CSI-RS).

8. The method according to claim 6, wherein the second information indicates an index of a second vector group, and the second vector group comprises a positive integer number of vector(s) used for an Rx-beam.

9. The method according to claim 6, wherein the first information is dynamic, the first information is carried by a physical layer signaling.

10. The method according to claim 6, comprising:
transmitting a first signaling;
wherein the first information is used for determining at least one of a first antenna port group or an index of a first vector group, the first antenna port group comprises a positive integer number of antenna port(s), and the first vector group comprises a positive integer number of vector(s) used for an Rx-beam; the second information indicates an index of a second vector group, and the second vector group comprises a positive integer number of vector(s) used for an Rx-beam; the first signaling is used for determining at least one of a candidate antenna port group set, a first candidate vector group set or a second candidate vector group set; the first antenna port group is one candidate antenna port group in the candidate antenna port group set; the first vector group is one first candidate vector group in the first candidate vector group set; and the second vector group is one second candidate vector group in the second candidate vector group set the base station performs the transmitting of the first signaling prior to both the first time interval and the second time interval.

11. A UE for multi-antenna transmission, comprising:
a first transceiver, to transmit a first radio signal in a first time interval, and to receive a second radio signal in a second time interval; and
a first receiver, to monitor a third radio signal in a third time interval;
wherein the first radio signal comprises first information, and the second radio signal comprises second information; target information is used for a multi-antenna related receiving in the third time interval; a time-domain position of the second time interval is used for determining whether the target information is the first information or the second information; and a time-domain position of the third time interval is associated to a time-domain position of the first time interval; the multi-antenna related receiving refers to generation of a beamforming matrix for receiving; or the multi-antenna related receiving refers to a receiving corresponding to one multi-antenna transmission scheme in SFBC, STBC, Precoder Cycling or Transmit beamforming; or the multi-antenna related receiving refers to an antenna virtualization for receiving; the target information is provided by the UE when the target information is the first information, the target information is provided by a base station when the target information is the second information; the base station is a transmitter of the second radio signal; the first time interval and the second time interval are before the third time interval respectively, a first time window is before the third time interval; if the second time interval belongs to a first time window, the target information is the second information, and the UE determines beam information of the third radio signal according to the indication from the base station; if the second time interval does not belong to a first time window, the target information is the first information, the UE receives the third radio signal according to its own reporting in the first information; the third radio signal is used for transmitting a Downlink Control Information (DCI), and the UE performs blind decoding of the third radio signal in the third time interval; a physical layer channel corresponding to the third radio signal is Physical Downlink Control Channel (PDCCH).

12. The UE according to claim 11, wherein the first information is used for determining at least one of a first antenna port group or an index of a first vector group, the first antenna port group comprises a positive integer number of antenna port(s), and the first vector group comprises a positive integer number of vector(s) used for an Rx-beam; a transport channel corresponding to the second radio signal is a Downlink Shared Channel (DL-SCH); the antenna port in the first antenna port group is used for transmitting a Channel Status Information Reference Signal (CSI-RS).

13. The UE according to claim 11, wherein the second information indicates an index of a second vector group, and the second vector group comprises a positive integer number of vector(s) used for an Rx-beam.

14. The UE according to claim 11, wherein the first information is dynamic, the first information is carried by a physical layer signaling.

15. The UE according to claim 11, wherein the first transceiver receives a first signaling; the first information is used for determining at least one of a first antenna port group or an index of a first vector group, the first antenna port group comprises a positive integer number of antenna port (s), and the first vector group comprises a positive integer number of vector(s) used for an Rx-beam; the second information indicates an index of a second vector group, and the second vector group comprises a positive integer number of vector(s) used for an Rx-beam; the first signaling is used for determining at least one of a candidate antenna port group set, a first candidate vector group set or a second candidate vector group set; the first antenna port group is one candidate antenna port group in the candidate antenna port group set; the first vector group is one first candidate vector group in the first candidate vector group set; and the second vector group is one second candidate vector group in the second candidate vector group set; the UE performs the receiving of the first signaling prior to both the first time interval and the second time interval.

16. A base station for multi-antenna transmission, comprising:
  a second transceiver, to receive a first radio signal in a first time interval, and to transmit a second radio signal in a second time interval; and
  a first transmitter, to transmit a third radio signal in a third time interval;
  wherein the first radio signal comprises first information, and the second radio signal comprises second information; target information is used for a multi-antenna related receiving in the third time interval; a time-domain position of the second time interval is used for determining whether the target information is the first information or the second information; and a time-domain position of the third time interval is associated to a time-domain position of the first time interval; the multi-antenna related receiving refers to generation of a beamforming matrix for receiving; or the multi-antenna related receiving refers to a receiving corresponding to one multi-antenna transmission scheme in SFBC, STBC, Precoder Cycling or Transmit beamforming; or the multi-antenna related receiving refers to an antenna virtualization for receiving; the target information is provided by a UE when the target information is the first information; the target information is provided by the base station when the target information is the second information; the UE is a transmitter of the first radio signal; the first time interval and the second time interval are before the third time interval respectively, a first time window is before the third time interval; if the second time interval belongs to a first time window, the target information is the second information, and the UE determines beam information of the third radio signal according to the indication from the base station; if the second time interval does not belong to the first time window, the target information is the first information, the UE receives the third radio signal according to its own reporting in the first information; the third radio signal is used for transmitting a Downlink Control Information (DCI), and the UE performs blind decoding of the third radio signal in the third time interval; a physical layer channel corresponding to the third radio signal is Physical Downlink Control Channel (PDCCH).

17. The base station according to claim 16, wherein the first information is used for determining at least one of a first antenna port group or an index of a first vector group, the first antenna port group comprises a positive integer number of antenna port(s), and the first vector group comprises a positive integer number of vector(s) used for an Rx-beam; a transport channel corresponding to the second radio signal is a Downlink Shared Channel (DL-SCH); the antenna port in the first antenna port group is used for transmitting a Channel Status Information Reference Signal (CSI-RS).

18. The base station according to claim 16, wherein the second information indicates an index of a second vector group, and the second vector group comprises a positive integer number of vector(s) used for an Rx-beam.

19. The base station according to claim 16, wherein the first information is dynamic, the first information is carried by a physical layer signaling.

20. The base station according to claim 16, wherein the second transceiver transmits a first signaling; the first information is used for determining at least one of a first antenna port group or an index of a first vector group, the first antenna port group comprises a positive integer number of antenna port(s), and the first vector group comprises a positive integer number of vector(s) used for an Rx-beam; the second information indicates an index of a second vector group, and the second vector group comprises a positive integer number of vector(s) used for an Rx-beam; the first signaling is used for determining at least one of a candidate antenna port group set, a first candidate vector group set or a second candidate vector group set; the first antenna port group is one candidate antenna port group in the candidate antenna port group set; the first vector group is one first candidate vector group in the first candidate vector group set; and the second vector group is one second candidate vector group in the second candidate vector group set the base station performs the transmitting of the first signaling prior to both the first time interval and the second time interval.

\* \* \* \* \*